Patented Apr. 17, 1923.

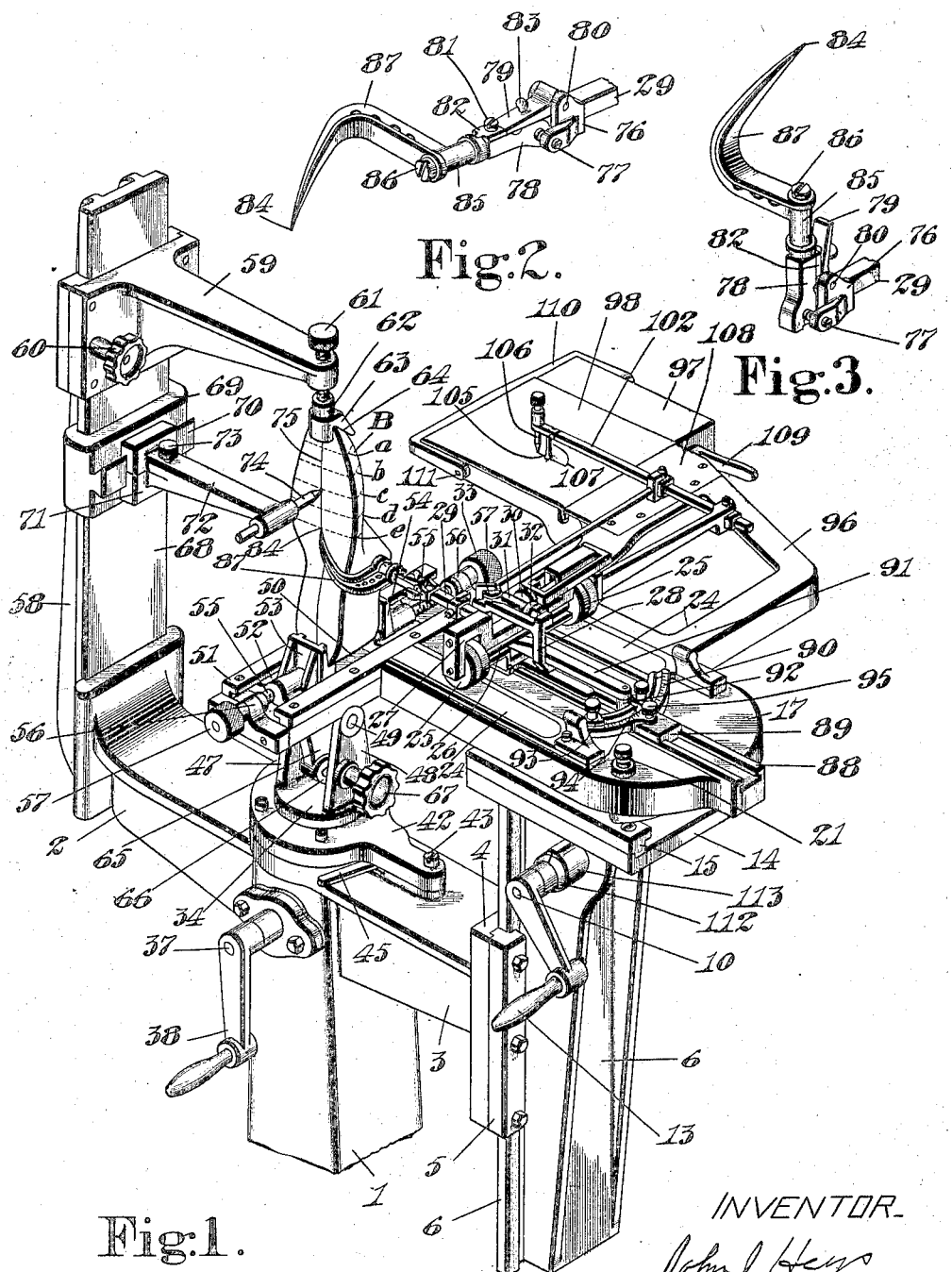

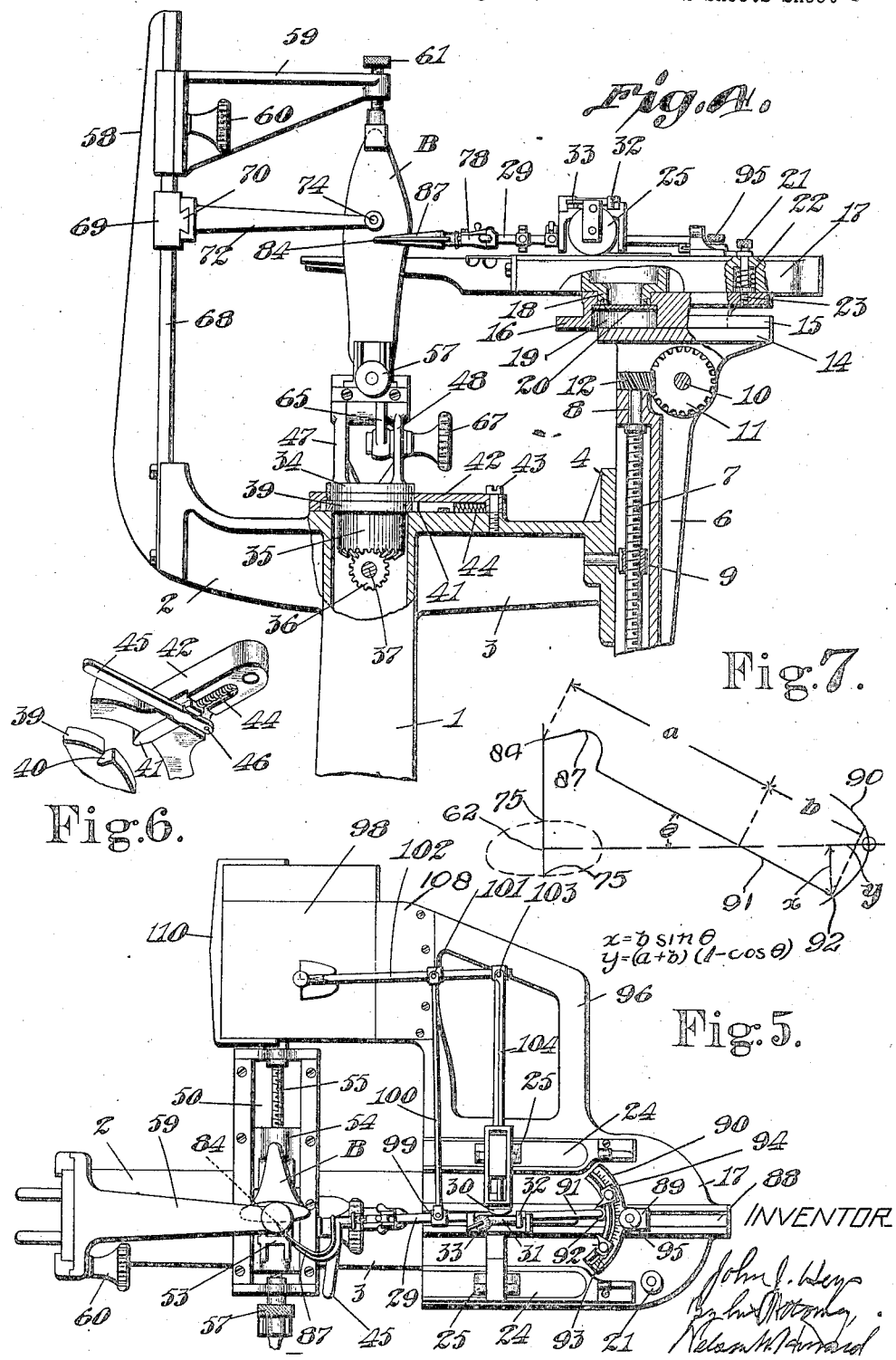

1,451,730

UNITED STATES PATENT OFFICE.

JOHN J. HEYS, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

METHOD OF AND MACHINE FOR MEASURING BODIES.

Application filed August 31, 1916. Serial No. 117,910.

*To all whom it may concern:*

Be it known that I, JOHN J. HEYS, a citizen of the United States, residing at Lynn, in the county of Essex and State of Massachusetts, have invented certain Improvements in Methods of and Machines for Measuring Bodies, of which the following description, in connection with the accompanying drawings, is a specification, like reference characters on the drawings indicating like parts in the several figures.

This invention relates to methods and machines for measuring bodies, and in particular for measuring areas of inaccessible sections of solid bodies. It is disclosed with particular reference to measuring areas of sections of shoe lasts.

There is at present no means for reliably ascertaining the size and form of a shoe last. The only measurements possible, under present conditions, are linear ones. The manufactured last is tested by girth measurements taken at several conventional points, and it is obvious that such measurements give no definite information about the foot room in the last. When a new women's model is ordered by a shoe manufacturer, the last maker makes, for example, a pair of 4B lasts with the proper girth measurements, shaping them according to his judgment. The shoe manufacturer makes a pair of shoes on these lasts, sends for a "model," i. e., a woman whom experience has shown to have a typical 4B foot, and tries the shoes on her. It is then determined how the wood in the lasts should be redistributed in order to make a good-looking and properly fitting, comfortable shoe. After perhaps several such trials the cross-sectional areas of the lasts are properly adjusted (the girths probably having been maintained unchanged from the beginning), and the entire set of lasts is then developed.

The practice is obviously expensive and unreliable and it is an important object of my invention to avoid these and others of its disadvantages by providing for ascertaining with rigorous accuracy the cross-sectional shape and area of a last, or foot, or other body, and ascertaining with corresponding exactness any discrepancies between it and a body with which it is to correspond.

Heretofore, various types of integrators have been employed to measure space characteristics of plane figures by moving the tracing point of the instrument along the boundary line of the plane figure until the tracing point has passed entirely around the figure back to the starting position. During this operation an arm carrying the tracing point moves for part of its travel over or above the area of the plane figure being measured. This is not practical when the sectional area of a solid body is to be measured, because the arm of the integrator would strike the body and prevent movement of the tracing point through its complete circuit of the body.

I contemplate broadly the measurement of space or form features or characteristics of solid bodies by traversing the external or accessible parts of such features with the tracing mechanism of an integrator and causing the recording mechanism of the integrator to include in its record, in addition, the result of a traverse of the internal or inaccessible parts of the features by the tracing mechanism. In another aspect, I contemplate the effecting of mechanical integration over a physically inaccessible path. The effecting of the described performance of the recording mechanism of the integrator, which is, moreover, effected without reference to the tracing mechanism as far as the interior of the body is concerned, is a very important feature of the invention.

Another important feature of the invention resides in making separate determinations or measurements relative to distinct parts of an inaccessible space characteristic of a body the measurement of which is desired, and then combining the measurements of the parts in order to get the required information about the whole.

The illustrated machine effects the planimetrical measurement of an area such as that of a desired cross-section of a body as for instance a last or foot, by considering the section as divided into parts having a portion of their boundaries in the interior of the body, tracing the exterior portions of the boundary of such a part with a planimeter tracing point, and causing the registering mechanism of the planimeter to include in its record the result of an additional movement of the tracing point over the internal portions of the boundary without actually carrying the point into the interior of the body, and important phases of the invention consist in causing the result of the movement of a tracing point over a definite line of the interior of a solid or plane body to be recorded, as by the registering mechanism of a planimeter, without actually carrying the point over the line, and in novel mechanism for so operating the recording mechanism of a planimeter. In the illustrated machine embodiment of the invention the internal boundaries of the parts of the section to be measured are straight lines, and the measurements of the segments into which the area of the required section is thus divided are combined to give the required total.

In order that the tracing point of the planimeter or integrator may conveniently reach all points of the periphery integrated over and in order to avoid crossing the periphery, the present invention contemplates, as an important feature thereof, that the relative positions of the planimeter or integrator and the body shall be changed during the traverse of the periphery by the tracing point. In the machine shown the tracing point is moved part way about the periphery and then the relative positions of the planimeter and section are changed to permit the tracing point to be moved the remainder of the way about the periphery.

The invention, in another important aspect, thus provides for mechanical integration around, upon or within a solid body without carrying parts of the integrator within or across the outline of the body.

The invention also contemplates the recording of the shape and preferably of the actual size of the section measured in such manner as to be visually apparent. An accurate reproduction of a plane section of a last has heretofore been obtainable only by actually cutting the last in the plane of section, and thereby destroying it. I accomplish the desired result by a procedure analogous to that described above in which geometrical recording functions corresponding to those of the planimeter recording mechanism are obtained. Preferably, in the mechanical embodiment of the invention, the recording device is controlled by the same mechanism which controls the recording mechanism of the planimeter, and draws an outline corresponding to the exterior and interior boundaries of a part of the section being measured.

It is desirable also in measuring some bodies, such, for instance, as the human foot or a last, to ascertain the sectional areas at different portions of the body. Another important feature of the invention, therefore, consists in mounting the body and the planimeter so that they may be relatively moved to present different sectional portions of the body to the action of the planimeter.

Other features of the invention, in addition to those hereinbefore referred to, will be described in connection with the accompanying drawings which show a good practical form of the invention, and then the several features will be definitely set forth in the claims.

In the drawings:—

Figure 1 is a perspective view of a machine embodying the present invention.

Fig. 2 is an enlarged detached view showing the tracer and its connection with the tracer arm.

Fig. 3 is a view similar to Fig. 2, but showing the tracer in another position.

Fig. 4 is a side elevation partly in section of the machine shown by Fig. 1, some of the parts being broken away.

Fig. 5 is a plan view of the machine.

Fig. 6 is a detached detail showing the lock and operating means for the body support.

Fig. 7 is a diagram illustrating the construction of a templet.

The drawings show and the following description will set forth the invention as used in connection with a boot or shoe last, cross-sectional areas of which are to be measured, but it will be understood that this particular use of the invention is for illustrative purposes only, and while it has special advantages in measuring cross-sectional areas of a last, it may also be employed to measure the sectional areas of any body, such as the human foot or other solid or semi-solid object.

The frame for supporting the various parts of the machine may be of any desired character and in the present instance of the invention consists of a column 1 from which extend the arms 2 and 3. The column 1 and arms 2 and 3 afford appropriate means for sustaining the body to be measured and a planimeter with the associated parts, the construction being such that the tracer point of the planimeter may be moved over or about the surface of the body, as will more fully appear. In the present instance of the invention the arm 3 is provided with a face plate 4, Fig. 1, to which are secured suitable cap pieces 5, one each side of the face plate, forming guides for a vertically movable slide 6 which may be raised and lowered by any suitable means, such as the screw 7 rotatably mounted on the slide at 8 and cooperating with a fixed nut 9 secured to the face plate 4. Mounted in the slide 6 is a shaft 10, operatively connected to the screw 7 by suitable gearing, such as the worm 11 and worm wheel 12. A handle 13 connected to the shaft 10 serves as a convenient means for rotating the shaft and, perforce, for raising or lowering the slide for a purpose that will presently appear.

The slide 6 serves as the support for a planimeter and in the present instance, the top of the slide carries a plate 14 having guideways 15 between which is mounted the carrier 16, Fig. 4, the construction being such that the carrier 16 may be moved over the top plate 14 between the guideways. Pivotally supported upon the carrier 16 is the planimeter table 17. The pivotal connection of the planimeter table 17 and carrier 16 may be variously contrived, but in the present instance the table 17 is provided with a downwardly projecting circular flange 18, which engages a corresponding opening 19 formed in the carrier and a plate 20 secured to the flange 18 serves to hold the parts in assembled relation. Mounted on the table 17 is a locking device for normally locking the planimeter table from rotative movement on the carrier 16. The locking device, shown, comprises a pin 21 passing through a portion of the table 17 or a part connected thereto, and normally under the influence of a spring 22, Fig. 4, tending to maintain the end of the pin in locking engagement with a recess 23 formed in part of the carrier 16. By lifting the pin 21 from locking engagement with the recess 23 in the carrier, the planimeter table and parts connected thereto may be turned to one side or the other from its normal operative position. This side movement of the planimeter table is sometimes desirable in order to remove the tracer or other part of the planimeter from interference with the movement of the body being measured and to prevent the tracer or other part of the planimeter being struck and moved by the body when its position is being changed.

The lock 21—23 insures that the table will be returned exactly to original position.

The planimeter table 17 is provided with the surfaces 24 on which rest the usual rollers 25, rigidly attached to the axle 26 rotatably mounted in the frame 27 of the planimeter.

A frame 28 is pivoted to the frame 27 of the planimeter by vertical pivots so that the frame 28 may swing horizontally. The frame 28 carries a tracer arm 29. One of the rollers 25 is geared to a disk 30 having a spherical surface with its center in the pivotal axis of the frame 28 and which bears against a roller 31 carried by the swinging frame 28, said roller being operatively connected to the indicators 32 and 33 which register the reading of the instrument. These parts of the planimeter and their associated relation are or may be as usual in this class of instruments, and their construction and operation being well understood by those skilled in the art, it is unnecessary to more fully show and describe them.

With the illustrated embodiment of the invention, the tracing point of the planimeter is moved over the surface of the body part way around the periphery of the section being measured and the recording mechanism of the planimeter is then operated in such manner as to record the effect of moving the tracing point back to the starting point, the relation of the body and planimeter being then changed to permit a repetition of the operation upon another part of the section being measured. In the use of the machine shown the section is divided by a single straight line into two approximately equal parts, and therefore two such operations complete the measurement of one section of the body and the sum of the two areas as registered by the planimeter gives the entire area of that section. If at the time the tracer is moved about the body, a marker be associated with it for corresponding movement then there will be formed a geometric figure conforming with the surface contour of the section. To make clear these and other features of the invention, it is convenient at this time to describe the support for the body or last, sections of which are to be measured, and the manner of establishing the base lines on the surface of the body or last from one to the other of which the tracer is movable over the surface of the body or last.

Supported on the frame of the machine for rotative movement in a plane parallel to the plane of the planimeter, is the support for the body, which, in the present illustrated use of the invention, is a last B. The support comprises a base 34 having a portion 35, which may if desired, project into the column 1 and be provided with gear teeth for operative engagement with the teeth of a gear 38 secured to the shaft 37. A handle 38 secured to the shaft 37 serves as a convenient means of turning the support and the last thereon, when the position of the last is to be changed to present another portion of its surface to the action of the tracer. In order to lock the support in adjusted position, a flange 39 connected thereto is provided with locking notches for engagement by a locking pin. These notches 40, only one of which is shown in Fig. 6, may be conveniently located 180° apart, so that when one half of the section of the last has been measured, the support may be turned to present the other half to the action of the tracer. The locking pin 41 may conveniently be guided by a suitable recess in a hood 42, part of which in the present instance of the invention surrounds the base portion of the support, and is secured to the frame by suitable means, such as the screw 43. A spring 44 normally acts to force the locking pin into locking engagement with one of the notches 40, and a handle 45 pivoted at 46 and projecting through a slot of the hood 42, serves to disengage the locking pin from the notch when the support is to be turned.

Rising from the base 34 are the flanges or webs 47 and 48 between which is pivotally mounted at 49 a work table 50 by which the body to be measured is supported. Suitably connected to the work table are positioning devices for determining the position of the body with respect to the table. Where the body to be measured is a last, the positioning devices are such as to engage opposite portions of the last and by their adjustment move the clamped portion of the last longitudinally of the work table. In the present instance of the invention the table 50 is provided with guides 51 in which are movable the flanges 52 of the clamps 53 and 54. Each of the clamps 53 and 54 has connected to it an adjusting screw 55, preferably threaded into the clamp and held from longitudinal movement by a bearing 56 between two collars fast to each screw, Fig. 1, the construction being such that by means of the milled heads 57 the screws may be turned to clamp the last upon the table in any desired position.

Where sectional areas of a last are to be measured, it is desirable that the last be held in fixed position for the action of the planimeter tracer, and yet that the last be permitted movement about an axis substantially at right angles to the plane of the planimeter, or the path of the tracer as it is moved about the last. To this end it is found expedient to not only clamp the last upon the table, but also to support that portion of the last remote from the table, or as indicated in Fig. 1, the toe portion of the last.

Rising from the arm 2 is the standard 58 on which is adjustably mounted the arm 59, a set screw 60 being preferably employed to hold the arm 59 in any adjusted position. Threaded through the end portion of the arm 59 is the adjusting screw 61 the lower end portion of which is swiveled in a hub 62 preferably directly above the pivotal axis of the support 34 projecting from the toe block 63, and provided with a toe embracing portion 64, the construction being such that while the toe block 63 will serve to hold the toe portion of the last in fixed position, it will permit the block to swivel about or turn around relative to the screw 61, to thereby permit the last B to move with the work table as the latter is turned to present another portion of the last to the treatment of the planimeter, as hereinbefore described.

In measuring cross sectional areas of a last, it is desirable to position the last with the tread surface of the sole thereof in a plane substantially at right angles to the plane of the planimeter or tracer movement. The toe portion of the last being fixed by the toe block, the heel portion of the last as indicated in Fig. 1 may be adjusted back and forth along the table to bring the tread surface of the last into the desired plane. Owing to differences in lasts, it is sometimes necessary to tilt the supporting table in order to bring the tread surface of the last into the desired plane, and for this purpose there is projecting from the under portion of the table a flange 65, having a slot 66 which may be engaged by the clamping end of a set screw 67 mounted in one of the flanges rising from the base 34 of the work support. Obviously by the loosening the set screw 67 the inclination of the table may be varied as found necessary. Instead of using the set screw adjustment just described and as illustrated in Figs. 1 and 4, any appropriate adjusting means for regulating the tilt of the work table may be employed.

Having positioned the last with its tread surface in the desired plane, the present invention contemplates that there shall be placed upon opposite portions of the last surface a base line to indicate the starting and stopping point of the tracer as it is moved over the surface and about a part of the last. In the present instance of the invention the standard 58 is provided with a plane surface 68, over which is movable a base line marker. As illustrated in Fig. 1, the base line marker comprises a sleeve portion 69 movable longitudinally of the standard 58 and guided by the plane surface 68 thereof. The sleeve 69 is provided with a dovetail projection 70 which is engaged by a slide 71, preferably formed as part of an arm 72 projecting therefrom. For convenience of manufacture and for clamping the arm 72 in any desired position of adjustment, the slide 71 may be formed of two members, as indicated in Fig. 1, and a screw 73 may be employed for holding the members upon the dove-tail projection 70. Obviously the adjustment of the arm 72 transversely of the standard 58 may be variously effected, but the construction described has been found to be a good practical form of this feature of the invention.

The arm 72 carries in its end portion a marker 74, preferably located in the vertical plane passing through the pivotal axis of the hub 62 and of the support 34, and parallel to the surface 68, the pointed end of which is adapted to be moved with the sleeve 69 in parallel relation to the plane surface 68 of the standard 58 and produce upon the surface of the last the base line 75. By moving the marker 74 to one side and turning the last 180°, the base line 75 may be continued over the arched or upper surface of the last as will be readily understood.

The tracer arm 29 has secured thereto lugs 76, Figs. 2 and 3 to which is pivoted at 77 the tracer carrier 78, the construction being such that when desired the tracer may be moved from the position indicated in Fig. 2 to an inoperative position as indicated in Fig. 3, in order that the last or other body, the sectional area of which is being measured, may be turned with respect to the planimeter to present another portion of the last or body to the action of the tracer without disturbing the position of the planimeter.

In order to hold the tracer in its active or operative position a lock is provided. In the present form of the invention this lock comprises a tongue 79 pivoted at 80 to the lugs 76, and the tracer carrier 78 has secured thereto by a suitable means such as the screw 81 an abutment or shoulder 82, adapted when the locking tongue 79 is turned into locking position to engage the abutment or shoulder 82 and hold the tracer in its active or operative position as indicated in Fig. 2. If desired a small hand piece 83 may be secured to the locking tongue 79 by which to conveniently operate it.

The tracer point 84, Figs. 1, 2 and 3 is normally in axial alinement with the tracer arm 29, and inasmuch as the tracer point 84 must maintain a non-tangential bearing relation to the surface of the last over which it is moved, regardless of the changing contour thereof, the tracer 87 is offset between the tracer point and the tracer arm 29 and is mounted for movement about the axis passing through the tracer arm 29 and tracer point 84. In the present instance of the invention, the tracer carrier 78 is provided with an extended portion on which is loosely mounted the sleeve 85 of the tracer 87, said sleeve being held in position on the carrier 78 by suitable means such as screw 86. The deflection of the tracer between the tracer arm 29 and the tracer point 84 may be variously contrived, but, in the present instance of the invention, the tracer 87 projects laterally from the sleeve 85 and is curved or bowed to position the tracer point 84 in alinement with the axis of the tracer arm 29, the construction being such that as the tracer point 84 of the tracer is moved over the irregular surface of the last the tracer may be swung about the axis of the tracer arm to insure proper bearing of the tracer point upon the surface of the last.

In measuring the area of a section of the body, such as a last as indicated in the drawings, the point 84 of the tracer is placed on the base line 75 in the plane of section, as indicated in Fig. 1, and the indicators 32, 33 are read or moved to zero. The tracer point 84 is then moved in the plane of section from the base line 75 at one part of the last, about that surface of the last which is presented to the planimeter until it reaches the base line on the opposite surface of the last. In making the traversing movement over the surface of the last, the tracer 87 will be swung about the axis passing through the tracer arm and tracer point as the latter passes about the edge of the last joining the top and tread surfaces of the last in order to preserve a proper bearing relation of the tracer point with respect to the surface of the last over which it is being moved. In order to complete the measurement of a half portion of the section under consideration I have provided in the illustrated machine means for causing the recording mechanism to record the effect of a movement of the tracing point in a straight line back to the point of beginning after which it may be read. The difference of the readings of the planimeter will thereupon indicate the area of the half portion of the section bounded by this straight line and the curve traversed by the tracing point. During the movement of the recording mechanism corresponding to the rectilinear part of the boundary, the tracer carrying mechanism also returns to its starting position, in accordance with an important feature of the invention. In the machine shown the movement of the recording mechanism is due to the controlled movement of the tracer carrying mechanism, as will appear.

The mechanism for accomplishing the above described objects will now be explained. The planimeter table 7 is provided with a guideway 88 in which is mounted a block 89 carrying a templet or guide 90 against which may bear the rearwardly extending end portion 91 of the tracer carrying planimeter arm to direct the movement of the tracer carrying mechanism back to initial positions as hereinbefore described.

The extended end portion 91 of the tracer arm carries a pin or roller 92 and to determine empirically the shape of the templet 90, the tracer point 84 may be placed against a horizontal straight edge parallel to the surface 68 and moved along the same. As it is thus moved the pin or roller 92 will generate a curved line and on this the shape of the templet 90 is determined, so that when, in the use of the instrument, the pin or roller 92 is moved along the curve of the templet it will direct the movement of the tracer point in a straight line parallel to the surface 68. The dimensions of the templet may also be computed from the constants of the planimeter. If $a$ be the distance of the pivot of the frame 28 to the tracer point 84, and $b$ be the distance from this pivot to the effective end point of the arm 91, the abscissa of the templet curve requisite to guide the effective end point of the arm 91 will be $b \sin \Theta$, and its ordinate will be $(a+b)(1-\cos \Theta)$; $\Theta$ being the angle between the arm 91 and the perpendicular to the surface 68, the ordinate being measured toward the last B, and the origin being taken at the middle point of the templet. See Fig. 7. The templet curve is, therefore, an ellipse with its center in the axis at 62 and with semi axes $b$ and $a+b$.

In the present form of the invention the templet 90 is carried by the block 89 which may be secured in adjusted position in the guide-way 88 by a thumb screw. Stops 93 and 94 are secured to the templet 90, and may be held in adjusted position by suitable set screws, as indicated in Fig. 1. This position will always be the same relative to the last holding mechanism, but may vary on the table 17 due to adjustment of the table in the guideways 15. The position of the templet corresponds to movement of the tracer point 84 in the plane containing the base lines 75. When the tracer point 84 is placed upon the base line 75, the templet 90 is moved up to this position, thus bringing the pin or roller 92 in contact therewith, and one of the stops is then brought up to the pin or roller 92 as indicated in Fig. 1, and secured in position. The templet is then moved away from the end of the tracer arm, and the tracer point is moved about the last until it reaches the base line 75 on the other surface of the last. The templet 90 is again moved into the same position and into contact with the pin or roller 92 and the other stop is brought into bearing relation with the pin or roller 92. The templet with its two stops when placed in position will accordingly guide the pin or roller 92 in such manner as to cause the tracing point to move in a straight line in the plane of section from one base line 75 to the other. The recording mechanism of the planimeter will at the same time record exactly as if the tracing point were actually moving along the straight line in question.

The machine may then be used as follows: The tracer point 84 will be placed on a base line 75 and the recording scales read. The point will then be moved around half the periphery of the last as described above until it reaches the other base line 75 on the other side of the last. The templet 90 is then moved to its operative position, in which the pin 92 will be in contact with the templet and with a stop 93 or 94, previously adjusted as described. The tracer is then unlocked and turned into the position indicated by Fig. 3 and the pin or roller 92 is moved along the templet between the two stops 93 and 94, the result being that the tracer carrying mechanism will be moved back to initial position. In order to complete the measurement of the section of the last, the last supporting means, hereinbefore described, is turned 180°, during which movement of the last the tracer will be turned to its inoperative position as indicated in Fig. 3, or the planimeter will be withdrawn in order that the last may not strike the tracer point. The last being now in position presenting the complemental portion of the section to the action of the tracer point, the latter is turned to operative position again and the entire operation of adjusting the stops 93, 94 and measuring the complemental half section is performed just as previously described with reference to the first half section. It should be noticed that the rotation of the last 180° rotates the plane containing the base lines 75 through the same angle and brings it into coincidence with itself so that the rectilinear boundary between the two half sections will be in the same straight line in either position of the last, and the sum of the results obtained by the two operations will therefore be the area of the desired section.

It will be evident without further discussion that these operations may be performed on a human foot by supporting it similarly to the last illustrated. In measuring the human foot or a last, sectional areas should be taken at a number of points along the length of the foot or last. The number of these sections may, of course, vary, but they will be sufficient to enable an accurate knowledge of the sectional area throughout the foot or the last to be known. In Fig. 1, the last is shown as provided with dotted lines, $a$, $b$, $c$, $d$, and $e$, each of which is intended to represent a section taken through the last. If a number of sections be taken of the human foot, and a last made from such measurements, and then the last be placed in the machine and the area of corresponding sections be taken of the last, the area of the sections of the foot and the area of the sections of the last should correspond. If they do not the last may readily be corrected. To permit the series of sectional areas $a$, $b$, $c$, $d$, and $e$, to be taken it is necessary after each operation of the tracer point to relatively move the body and the planimeter to present successively the various parts of the body at which the cross sections are to be taken, and in order that the sections of the human foot and the last made from the measurements thereof may correspond in their location it is desirable to provide some means for gaging the relative position of the body being measured and the planimeter. To this end, in the present instance of the invention, a scale is provided to indicate the position of the planimeter table and perforce of the plane of movement of the tracer point 84. This scale may be variously contrived and conveniently located, but, in the illustrated form of the invention, the scale 112 is associated with the bearing 113 projecting from the slide 6 over which a pointer connected with the shaft 10 may move and indicate the position of the table as the shaft is turned.

Instead of taking the sectional areas of the foot and last in parallel planes as indicated in Fig. 1, it is obvious that the foot or last, or both may be positioned on the work supporting table so that the section passed through either and measured by the planimeter may be diagonally disposed with reference to the tread surface of the last. Such measurements frequently are desirable about the shank and over the instep.

An important feature of the invention relates to the production of a diagrammatic representation of the outline of the section the areal measurement of which has been described. This is frequently required where templets are to be made representing cross sections of the last or other body. In the present instance of the invention the planimeter table 17 has projecting from one side thereof the arm or frame 96 on which a piece of paper may be placed. In order to represent upon the paper 98 placed on the table 97, the outline of the geometric figure formed by the intersection of the plane of section with the surface of the body, the planimeter arm has pivotally connected therewith at 99 an arm 100, the opposite end of which is pivotally connected at 101 to a scribing arm 102. The scribing arm 102 is pivotally connected at 103 to an arm 104 extending rigidly from the frame 27 of the planimeter on the line of its pivotal connection with the frame 28 of the planimeter. The distance from 103 to the pivotal axis of the frames 27, 28 is equal to the length of the arm 100, and the distance from 99 to the said pivotal axis is equal to the distance from 101 to 103. The free end of the scribing arm 102 is provided with a rest 105, Fig. 1, which may normally support the scribing arm 102 as it is moved over the surface of the paper 98 on the scribing table 97. Vertically adjustably mounted in the end of the scribing arm 102 is the marker or pencil 106, Fig. 1. The effective length of the arm 102 is preferably equal to the distance from the pivotal axis of the frames 27, 28 to the tracing point 84. The structure described therefore forms a pantagraph with a reproduction ratio of unity. The construction may be altered to produce other ratios if desired. As the tracer point 84 moves about the body being measured, the pencil scribes or marks upon the surface of the paper the geometric figure produced by the movement of the tracer point about the surface of the body. This is represented at 107, Fig. 1, wherein the figure on the paper represents that the tracer point 84 has moved from the top portion of the last over the surface thereof to the base line 75 on the tread surface of the last. When the tracer is turned into inoperative position, as represented in Fig. 3, and its carrying mechanism is moved back to its initial position, as hereinbefore described, the marker or pencil 106 will move in a straight line from its position indicated in Fig. 1, to complete and close the outline produced on the paper.

When the other half section is measured the paper may be shifted in order to obtain the corresponding outline on an unused part of the paper and the two half outlines may be cut out and placed together in proper relative position. If the paper is not moved, the two half diagrams will be superposed, as shown in Fig. 5.

The diagrams described may be used to avoid the necessity of setting the stops 93, 94. The tracing point may be moved from one base line to the other around the last and the templet then advanced to operative position. During the movement of the tracing point the marker will have generated the outline passed over upon the paper. The movement of the pin or roller 92 on the templet will guide the marker in a straight line from the latter end of its described path toward the other and the movement of the instrument can be stopped at the instant that the marker reaches its initial position. The recording mechanism of the planimeter will record as before. The use of the stops makes the operation somewhat more positive and reliable as it avoids the vitiation of the results by any chance disturbance of the planimeter during the turning of the tracer 87 into inoperative position.

Suitable means should be provided to hold the paper 98 flat upon the scribing table 97. In the present instance of the invention the arm 96 has a spring plate 108 secured thereto which may be lifted at times from its normal position indicated in Fig. 1 by a handle 109 to permit the edge of the paper 98 to be placed beneath the spring plate, the construction being such that when the spring plate is returned to its normal position it will hold one edge of the paper, the other edge of the paper may be held to the scribing table by means of a yoke 110 pivoted at 111 to the side portions of the scribing table.

The mode of operation in ascertaining the sectional area of a body sustained upon the work table or support has been sufficiently set forth in connection with the detailed description, and it will be apparent that areas of sections either of the human foot or a last, or indeed any body may be readily ascertained, as well also as the linear distance about the body.

While I have described my invention in connection with the measurement of the areas of plane cross sections of solid bodies, I do not intend that the scope of the appended claims shall be limited in that manner. I intend that the discussions of measurements hereinafter shall not be limited to the illustrative applications but shall be interpreted broadly to mean the quantitative determination of any geometrical, space, or form characteristic of a body including, for example, moments, moments of inertia, volumes, centers of gravity, superficial or sectional areas, curvatures, masses, etc.

Claims:

1. Improvement in methods of measuring the sectional area of a last, which consists in marking two points on the last, moving the tracer of a planimeter between the two points over one side of the last, returning the tracer carrying mechanism to initial position by a movement corresponding to a movement of the tracing point in a straight line to initial position, then moving the tracer between the two points over the other side of the last, and returning the carrying mechanism to initial position as before.

2. In a machine of the character described, the combination of a support for holding a body an inaccessible sectional area of which is to be measured, a planimeter having a tracer, means for supporting the planimeter with the tracer movable in the plane of section about the surface of the body while in contact therewith, means constructed and arranged relatively to present the section periphery and the planimeter tracer to permit the tracer to traverse all parts of the periphery, and means for obtaining the area of the section from a traverse of the tracer over the periphery.

3. In a machine of the character described, the combination of a support for holding a body the sectional area of which is to be measured, a planimeter having a tracer, and means for relatively supporting the planimeter and the tracer to permit movement of the tracer in the plane of section about the surface of the body while in contact therewith and means movable with the tracer for scribing the entire outline of the section.

4. In a machine of the character described, the combination of a support for holding a body the sectional area of which is to be measured, a planimeter having a tracer movable over the surface of the body in the plane of section while in contact with the body, and means for guiding the tracer carrying mechanism in a movement corresponding to a movement of the tracer in a straight line to initial position after having been moved over a portion of the surface of the body.

5. In a machine of the character described, the combination of a support for holding a body the sectional area of which is to be measured, a planimeter having a tracer movable over the surface of the body in the plane of section while in contact with the body and means for relatively adjusting the body and planimeter to determine the angle of the plane.

6. In a machine of the character described, the combination of a support for holding a body the sectional area of which is to be measured, a planimeter having a tracer movable over the surface of the body while in contact therewith, and means for adjusting the body relative to the plane of movement of the tracer about the body for determining the angle of the plane of section through the body.

7. In a machine of the character described, the combination of a support for holding a body the sectional area of which is to be measured, a planimeter having a tracer movable over the surface of the body while in contact therewith, means for adjusting the body relative to the plane of movement of the tracer about the body for determining the angle of the plane of section through the body, and means for guiding the tracer to initial position after having been moved about a portion of the body.

8. In a machine of the character described, the combination of a support for a body the sectional area of which is to be measured, a planimeter having an arm, a tracer connected to the arm and movable over the surface of the body while in contact therewith, and means acting upon the tracer arm to insure movement of a point normally at the end thereof in a straight line in returning the tracer to initial position.

9. In a machine of the character described, the combination of a support for a body the sectional area of which is to be measured, a planimeter having an arm, a tracer connected to the arm and movable over the surface of the body while in contact therewith, and means acting upon the tracer arm to insure movement thereof to initial position and a scribing device movable with the tracer arm to graphically represent the path of the operative position of the tracer.

10. In a machine of the character described, the combination of a support for a body the sectional area of which is to be measured, a planimeter having a tracer, means for supporting the planimeter with the tracer movable in the plane of section about the body while in contact therewith, and means for relatively moving the planimeter and body to present another section of the body for measurement.

11. In a machine of the character described, the combination of a support for holding a body the sectional area of which is to be measured, a planimeter having a tracer constructed and arranged for movement over the surface of the body in the plane of section, and means for relatively shifting the position of the planimeter and body to present the tracer to measure the area of another section of the body.

12. In a machine of the character described, the combination of a support for holding a body the sectional area of which is to be measured, a planimeter having a tracer constructed and arranged for movement over the surface of the body, a support for the planimeter, and means for changing the position of the body that the tracer may act in the plane of section completely around the body.

13. In a machine of the character described, the combination of a support for a body the area of a section of which is to be measured, a planimeter having a tracer arm, a tracer movable about the surface of the body while in contact therewith, and connections between the tracer arm and tracer permitting the tracer to be moved relatively to the arm while maintaining undisturbed the relation between the arm and the operative position of the point of the tracer.

14. In a machine of the character described, the combination of a support for holding a body the sectional area of which is to be measured, a planimeter having a tracer arm, a tracer having a deflected portion and a point and movable about the body in the plane of section while the point is in contact with the body, and connections between the tracer arm and tracer permitting the tracer to be moved relatively to the arm while maintaining the point of the tracer in undisturbed bearing upon the surface of the body.

15. In a machine of the character described, the combination of a support for holding a body in fixed position, a planimeter having a tracer movable about a portion of the body while in contact therewith, and means for shifting the support to present an opposite portion of the body to the action of the tracer.

16. In a machine of the character described, the combination of a support for holding a body the sectional area of which is to be measured, a planimeter having a tracer movable about a portion of the body in the plane of section while in contact with the body, means for guiding the planimeter in a movement corresponding to integration over a straight line to return the tracer to initial position after having been moved part-way around the body, and means for presenting the complemental portion of the body to the action of the tracer to complete the sectional measurement.

17. In a machine of the character described, the combination of a support for holding a body the sectional area of which is to be measured, a planimeter having a tracer movable about a portion of the body in the plane of section while in contact with the body, a cam for guiding the planimeter in a movement corresponding to integration over a straight line to return the tracer to initial position after having been moved part-way around the body, means for presenting the complemental portion of the body to the action of the tracer to complete the sectional measurement and means movable with the tracer to graphically represent the figure corresponding to the planimeter movements.

18. A planimeter comprising, in combination, a tracer arm, and a tracer connected thereto and having the portion between the tracer point and tracer arm deflected out of the straight line connecting the tracer point and tracer arm and having a pivoted connection with the tracer arm whereby the tracer point may be swung out of operative position.

19. In a machine of the character described, the combination of a support for holding a body the sectional area of which is to be measured, a planimeter having a tracer bar carrying a tracer movable over the surface of the body in the plane of section, a scriber connected to the tracer bar, and means comprising a cam for directing the movement of the scriber in a straight line to initial position after the tracer has been moved part way about the body.

20. In a machine of the character described, the combination of a support for holding a body sectional areas of which are to be measured, a planimeter having a tracer movable about the body in the plane of section while in contact with the surface of the body, and means for relatively moving the body and planimeter to measure the areas of sections through different portions of the body, and means for determining the position of the sections that corresponding sections may be taken through different bodies.

21. In a machine of the character described, the combination of a support for holding a body the sectional area of which is to be measured, a planimeter having a tracer bar and having a tracer point movable about the body while in contact with the surface thereof, means for turning the support to present a complemental portion of the body in the plane of section to the tracer, and means for guiding the tracer bar in a predetermined path as it is moved to carry the tracer back to initial position.

22. A machine for measuring sectional areas of a solid body, comprising, in combination, a planimeter having a tracer movable about the solid body while in contact with the surface thereof, and a support for holding the body with a part thereof passing through the plane of the planimeter.

23. A machine for measuring sectional areas of a body, comprising, in combination, a planimeter having a tracer movable about the body in the plane of the desired section measurement, a support for holding the body with the part thereof to be measured located in the plane of section, and means for establishing base lines on the body for indicating the initial and final positions of the tracer as it is moved about the body.

24. A machine for measuring sectional areas of a body, comprising, in combination, a planimeter having a tracer movable about the body in the plane of the desired section measurement, a support for holding the body with the part thereof to be measured located in the plane of section, means for establishing base lines on the body for indicating the initial and final positions of the tracer as it is moved about the body and a scriber movable with the tracer to graphically represent the contour of the body traversed by the tracer between the base lines.

25. A machine for measuring sectional areas of a body, comprising, in combination, a planimeter having a tracer movable about the body in the plane of the desired section measurement, a support for holding the body with the part thereof to be measured located in the plane of section, means about the body, a contact point on the tracer, and a cam having the outline traced by the contact point as the tracer moves in a predetermined path about the body and means for guiding the tracer in a predetermined path as it is returned to initial position.

26. A machine for measuring sectional areas of a body, comprising, in combination, a planimeter having a tracer arm, a tracer mounted for movement about the body in the plane of section and connected to the tracer arm, and a guide for directing the movement of the tracer arm and tracer when they are returned to initial position.

27. In a machine for measuring sectional areas of bodies, the combination of a planimeter having a tracer arm, a tracer connected thereto and movable about the body while in contact with the surface thereof, a guide for directing the movement of the tracer arm when the tracer is to be moved to initial position, and means for permitting the guide to be moved to and from operative position.

28. In a machine for measuring sectional areas of bodies, the combination of a planimeter having a tracer arm, a tracer connected thereto and movable about the body while in contact with the surface thereof, a guide for directing the movement of the tracer arm when the tracer is to be returned to initial position, and a stop for limiting the movement of the tracer arm.

29. In a machine for measuring sectional areas of bodies, the combination of a planimeter having a tracing arm, a tracer connected to the arm and movable about the surface of the body and a templet having a guiding portion to direct the movement of the tracer arm when the tracer is returned to initial position.

30. In a machine for measuring sectional areas of bodies, the combination of a planimeter having a tracing arm, a tracer connected to the arm and movable about the surface of the body and a templet having a guiding portion to direct the movement of the tracer arm when the tracer is returned to initial position, and stops for limiting the movement of the tracer arm.

31. In a machine for measuring sectional areas of bodies, the combination of a planimeter having a tracer arm, a tracer having a tracer point movable about the body while in contact with the surface thereof, and connections between the tracer and tracer arm permitting movement of the tracer from operative position without disturbance of the registering mechanism, and constructed and arranged to preserve the necessary operative adjustment to permit the tracer to be replaced in operative position.

32. In a machine for measuring sectional areas of bodies, a tracer arm, and a tracer having a tracing point in axial alinement with the tracer arm, and a deflected portion between the point and tracer arm, and having a connection with the tracer arm whereby the tracing point may be moved out of operative position and when returned thereto will be automatically positioned in operative relation while preserving the operative relations of other parts of the machine.

33. In a machine for measuring sectional areas of bodies, a tracer arm, and a tracer having a tracing point in axial alinement with the tracer arm, and a portion extending to one side of the line joining the tracer point and tracer arm, and a pivotal joint between the tracer arm and the tracer whereby the tracer may be moved out of operative position, said connection being constructed and arranged to preserve the operative relation of the other parts of the machine and to insure the replacement of the tracing point in proper operative adjustment.

34. In a machine for measuring sectional areas of bodies, a tracer arm, a tracer having a tracer point in axial alinement with the tracer arm, and connections between the tracer and tracer arm permitting the tracer point to be moved out of axial alinement with the tracer arm without loss of adjustment.

35. In a machine for measuring sectional areas of bodies, a tracer arm, a tracer having a tracer point in axial alinement with the tracer arm, and connections beween the tracer and tracer arm permitting the tracer point to be moved out of axial alinement with the tracer arm, and a lock for holding the tracer point in axial alinement with the tracer arm.

36. In a machine of the character described, the combination of a planimeter having a tracer, a support for holding one portion of the body the sectional area of which is to be measured, and a swiveling support for engaging another portion of the body that the holding support may be turned to present different portions of the body to the field of operation of the tracer.

37. In a machine for measuring sectional areas of a last, the combination of a table, means for clamping the heel end of the last to said table, a freely rotatable toe block for holding the toe end of the last, a planimeter having a tracer movable about the last while in contact with the surface thereof, means for rotating the table that the last may be turned to present either side of the last in the field of action of the tracer, and a scriber for establishing base lines on the last, arranged to move in a plane containing the axis of rotation of the table.

38. In a machine for measuring sectional areas of a body, means for supporting the body in fixed position, a planimeter support, a planimeter table mounted for movement on said support and having a tracer movable about the body while in contact therewith, and means for locking the planimeter table from movement on the support.

39. That improvement in the art of measuring bodies which consists in carrying the tracing mechanism of an integrator over the external portion of a partially internal feature of the body which it is desired to measure, and causing the registering mechanism of the integrator to include in its record the result of carrying the tracing mechanism over the internal portion of the feature to be measured.

40. That improvement in the art of measuring bodies which consists in carrying the tracing mechanism of an integrator over the external portion of a partially inaccessible feature of the body which it is desired to measure, and causing the registering mechanism of the integrator to include in its record the result of carrying the tracing mechanism over the internal portion of the feature to be measured without actually carrying the tracing mechanism within the body.

41. That improvement in the art of measuring bodies which consists in carrying the tracing mechanism of an integrator over the external portion of an internal feature of the body which it is desired to measure, and causing the registering mechanism of the integrator to include in its record the result of carrying the tracing mechanism over the internal portion of the feature to be measured without actually carrying the tracing mechanism over the inaccessible portion of the said feature.

42. That improvement in the art of measuring bodies which consists in carrying the tracing point of a planimeter around the external boundary of a part of an intermediate cross-section of the body, and causing the registering mechanism of the planimeter to include in its record the result of an additional movement of the tracing point over the internal boundary of the part of the cross-section.

43. That improvement in the art of measuring bodies which consists in carrying the tracing point of a planimeter around the external boundary of a part of an intermediate cross-section of the body, and causing the registering mechanism of the planimeter to include in its record the result of an additional movement of the tracing point over the internal boundary of the part of the cross-section, without actually carrying the tracing point within the body.

44. That improvement in the art of measuring bodies which consists in carrying the tracing point of a planimeter around the external boundary of a part of an intermediate cross-section of the body, and causing the registering mechanism of the planimeter to include in its record the result of an additional movement of the tracing point over the internal boundary of the part of the cross-section, without actually carrying the tracing point over the said internal boundary.

45. That improvement in the art of measuring characteristic properties of cross-sections of solid bodies which consists in establishing sub-divisions on the periphery of an inaccessible cross section of the body a characteristic property of which it is desired to measure, making separate integrator measurements by tracing over the sub-divisions and combining the results of the separate measurements.

46. That improvement in the art of measuring bodies which consists in establishing terminal points on the surface of the body, integrating mechanically between these points over the surface of the body and completing the mechanical record of the integration by combining therewith the result corresponding to an integration through the body between the points.

47. That improvement in the art of measuring bodies which consists in establishing terminal points on an internal characteristic to be measured, integrating mechanically between the points over a part of the characteristic, relatively moving the integrator and the body to permit access to the remaining portion of the characteristic and again integrating between the points over said last-named portion.

48. That improvement in the art of measuring inaccessible characteristics of bodies which consists in regarding the characteristic which it is desired to measure as divided into parts, making integrator measurements by contact with the accessible portions of a part, causing the registering mechanism of the integrator to include the result incidental to contact with the inaccessible portions of the part, and combining the separate results so obtained from each of the parts.

49. In a machine of the class described, a support for the body to be measured, mechanism for locating two points of the body, and integrating means constructed and arranged to effect integration between the points fixed by the locating means along a path inaccessible to the integrating means.

50. That improvement in the art of reproducing outlines of bodies which consists in guiding a marker to reproduce a portion of the periphery of that part of the object whose outline is desired lying between two points of the periphery and guiding the marker to reproduce a predetermined line within the object joining the two said points.

51. That improvement in the art of reproducing sections of bodies which consists in guiding a marker from a portion of the periphery of the object to reproduce that portion of the periphery, guiding the marker to reproduce a predetermined line joining the ends of the said portion, and similarly generating reproductions of other partial sections which shall fit together along the reproduced predetermined lines to form a complete section.

52. That improvement in the art of reproducing sections of bodies which consists in forming reproductions of portions of the section by guiding a marker from the external boundaries of the portions, and guiding a marker to reproduce predetermined lines forming the internal boundaries of the portions, such that the reproductions of the portions will fit together in a whole.

53. In a machine of the class described, an integrator having a tracer arm, having a plurality of contact points thereon, and a guide for one contact point having the shape traced by the said point while the other said contact point moves over a definite path passing through the interior of the body to be measured.

54. In a machine of the class described, means for holding the body to be measured, an integrator having a primary tracing point for traversing the body, and a secondary tracing point, a tracer carrying mechanism through which both points are connected with the registering mechanism of the integrator, and a cam for guiding the secondary tracing point whereby the registering mechanism of the integrator may be caused to register the result of a traverse of the primary tracing point over an inconveniently- or non-accessible path joining two accessible points of the body.

55. In a machine of the class described, means for holding the body to be measured, an integrator having a primary tracing point for traversing the body, and a secondary tracing point, a tracer carrying mechanism through which both points are connected with the registering mechanism of the integrator, and a cam for guiding the secondary tracing point whereby the registering mechanism of the integrator may be caused to register the result of a traverse of the primary tracing point over a straight line lying in the interior of the body to be measured.

56. In a machine of the class described, means for guiding a marker to reproduce a portion of the outline of a body to be measured, and means for guiding the marker to reproduce a predetermined line joining the ends of the portion.

57. In a machine of the class described, means for guiding a marker to reproduce by contact with the body a portion of the outline of a body to be measured, and means independent of contact with the body for guiding the marker to reproduce a predetermined line joining the ends of the portion.

58. That improvement in methods of measuring cross-sectional areas of solid bodies which consists in presenting the body to be measured to a mechanical integrator from one side and then rotating the body to present another side in the plane of section of said body to the integrator, the integrator being moved about the body each time said body is turned to present successive portions to the integrator.

59. That improvement in methods of measuring areas of cross sections of bodies which consists in presenting a body to a mechanical integrator and passing the tracing point of the integrator around it, always keeping the tracing point between the body and the remainder of the integrator whereby no part of the integrating mechanism crosses the outline of the body.

60. That improvement in methods of measuring areas of cross sections of solid bodies which consists in relatively moving the body and a mechanical integrator to effect a revolution of the integrator relatively to the body whereby the integrator may reach all sides of the body.

61. That improvement in methods of measuring areas of sections of bodies which consists in mechanically integrating around the periphery of the section, in successively-coterminal portions keeping all parts of the integrator outside a cylindrical surface having the periphery as directrix and a perpendicular to the section as generatrix.

62. In a machine of the class described means for holding a body to be measured, a mechanical integrator comprising a feeler point constructed and arranged to follow a substantial portion of the periphery of the body and means for rotating the body to present successive portions of it to the integrator whereby integration is effected around the body without carrying any part of the integrator within a cylinder enveloping the body and transverse to the plane of measurement.

63. In a machine for measuring sections of a solid body, means for holding the body, and a mechanical integrator comprising a tracing point constructed and arranged to measure the body by carrying the tracing point around its periphery in steps without bringing any part of the integrator within a cylinder enveloping the section and lying transverse to it.

64. In a mechanical integrator, tracing means, registering means, and means for operating the registering means to register a predetermined movement of the tracing means independently of such actual movement by the tracing means.

65. In a mechanical integrator, a carrier, tracing means mounted on the carrier constructed and arranged to move the carrier as the tracing means traverses the path of integration, registering means connected with the carrier for recording the result of the integration, and means for controlling the carrier independent of the operation of the tracing means to cause the movement of the carrier corresponding to a predetermined movement of the tracing means.

66. In an integrator, tracing means, a carrier for the tracing means pivoted to the body of the integrator, a guide for the carrier constructed and arranged to cause the movement of the carrier due to a traverse of the tracing means over a predetermined path.

67. In an integrator, tracing means, a pivoted arm carrying the tracing means, and a templet constructed and arranged to engage the arm and having a shape equivalent to the path traversed by the point of engagement on the arm as the tracing means traverses a predetermined line.

68. That improvement in the art of integrating over an inaccessible path on a body which consists in moving the main tracer point of an integrator along a line of desired shape and length, the integrator body being provided with a secondary tracer point controlled by the movements of the main tracer point, ascertaining the path simultaneously traversed by the secondary tracer point, forming a cam substantially coinciding with said path, and guiding the secondary tracing point of the integrator from said cam to cause the main tracing point to retrace its path.

69. That improvement in the art of constructing mechanical integrators which consists in moving the main tracer point of the integrator along a line of desired shape and length, the integrator body being provided with a secondary tracer point controlled by the movements of the main tracer point, ascertaining the path simultaneously traversed by the secondary tracer point, and forming a cam substantially coincident with the said path.

In testimony whereof I have signed my name to this specification.

JOHN J. HEYS.

Certificate of Correction.

It is hereby certified that in Letters Patent No. 1,451,730, granted April 17, 1923, upon the application of John J. Heys, of Lynn, Massachusetts, for an improvement in "Methods of and Machines for Measuring Bodies," errors appear in the printed specification requiring correction as follows: Page 4, line 78, strike out the article "the"; page 5, line 103, for the word "positions" read *position;* page 8, line 17, claim 1, before the word "carrying" insert the word *tracer;* and that the said Letters Patent should be read with these corrections therein that the same may conform to the record of the case in the Patent Office.

Signed and sealed this 24th day of July, A. D., 1923.

[SEAL.]

WM. A. KINNAN,
*Acting Commissioner of Patents.*